Oct. 13, 1942.　　　C. E. MEYERHOEFER　　　2,298,802
ACTUATOR
Filed Sept. 13, 1939　　　2 Sheets-Sheet 2
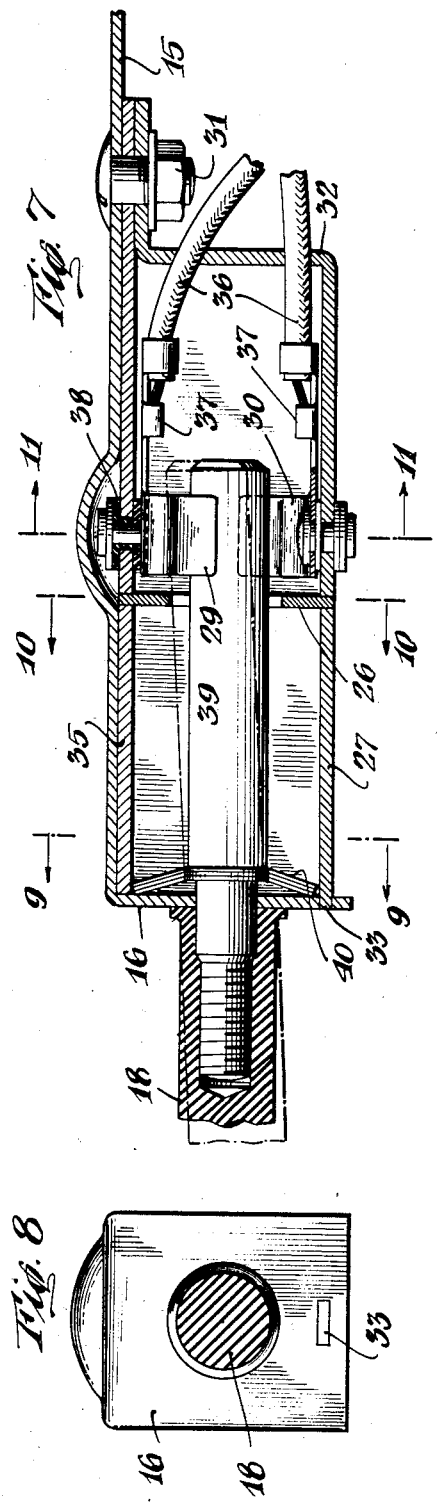
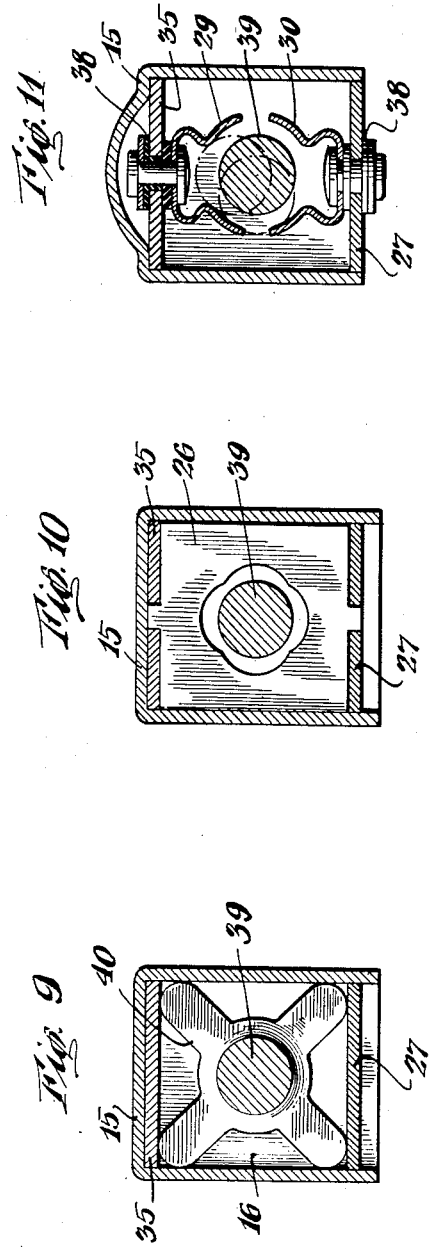
INVENTOR
Carl E. Meyerhoefer
BY
ATTORNEYS Patented Oct. 13, 1942

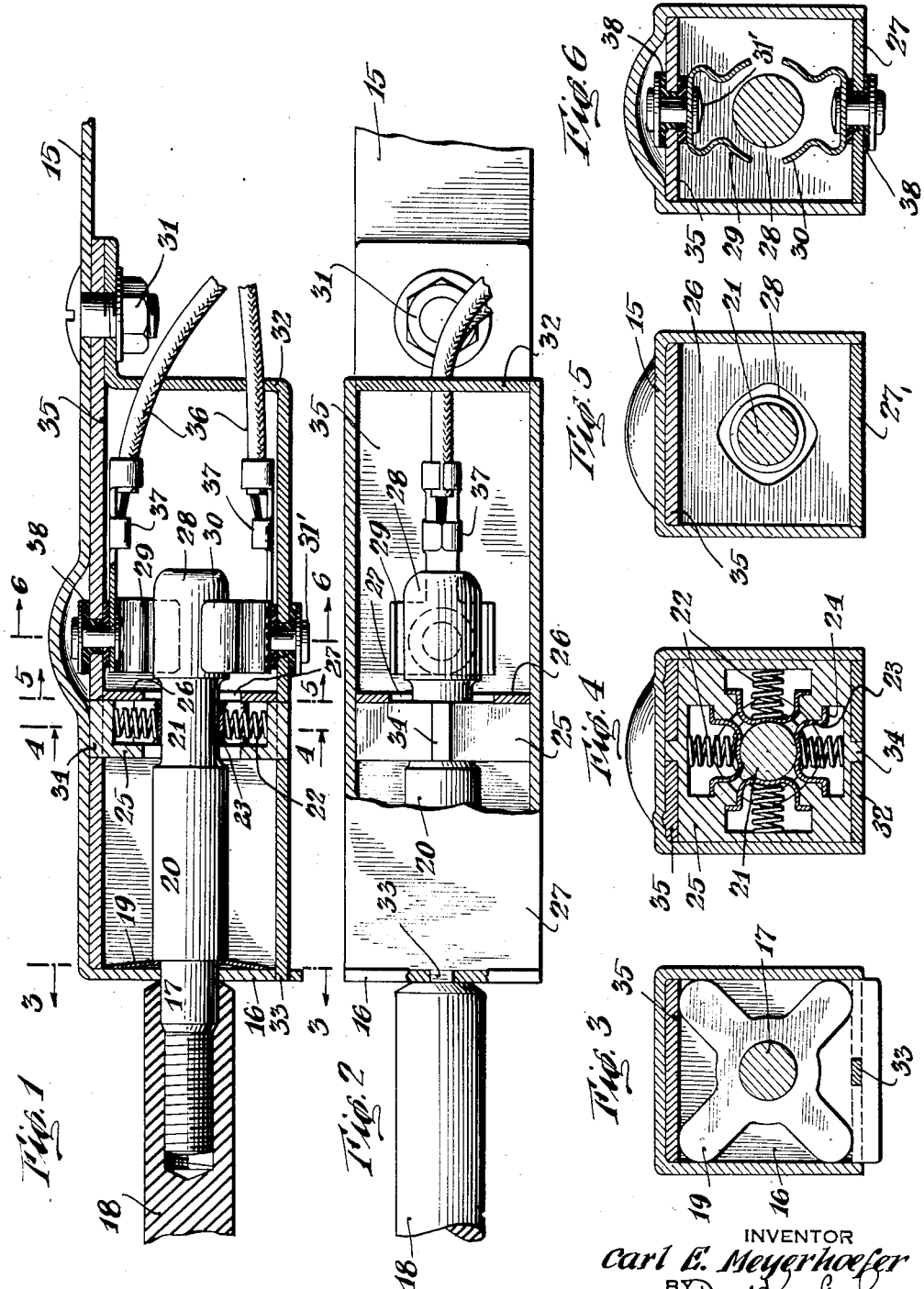

2,298,802

UNITED STATES PATENT OFFICE 2,298,802

ACTUATOR

Carl E. Meyerhoefer, Brooklyn, N. Y., assignor to E. A. Laboratories, Inc., Brooklyn, N. Y., a corporation of New York Application September 13, 1939, Serial No. 294,600

3 Claims. (Cl. 200—6)

This invention relates to a structurally and functionally improved actuator or switch, which is capable of use in numerous different associations, but is primarily intended for employment in conjunction with signalling apparatus.

It is an object of the invention to furnish a unit of this character which is a primary utility when employed, for example, in conjunction with the signalling system of a motor vehicle. When so disposed, it may be connected to a pair of horns having different characteristics and so that the operator may, without effort, actuate or sound either of such horns or may cause a simultaneous actuation thereof.

Thus, if one of such horns has low intensity characteristics, while the other of the same has high intensity characteristics, it will be apparent that under city driving conditions, the operator may sound solely the former while if he is travelling at a higher speed the latter horn may be caused to operate. Also, if travelling under open road conditions or if otherwise necessary, both horns may be sounded to give a warning signal of maximum intensity.

It is a further object of this invention to provide a unit of this character which will lend itself to quantity production and which will embody relatively few parts so that an actuator may be produced which can be sold at a nominal figure.

A still further object is that of providing a switch or actuator embodying a relatively compact and simple construction so that the unit will occupy a minimum amount of space.

Another object is that of furnishing a switch unit, the parts of which, when assembled, will function over long periods of time with freedom from all difficulties.

With these and other objects in mind, reference is had to the attached sheets of drawings, illustrating practical embodiments of the invention and in which:

Fig. 1 is a sectional side view of an actuator;

Fig. 2 is a bottom plan view thereof, with certain of the parts broken away to disclose overlying constructions;

Figs. 3, 4, 5 and 6 are transverse sectional views taken respectively along the lines 3—3, 4—4, 5—5 and 6—6 and in the direction of the arrows as indicated in Fig. 1;

Fig. 7 is a view similar to Fig. 1 but showing a slightly different form of construction;

Fig. 8 is an end view of the unit as shown in Fig. 7 and

Figs. 9, 10 and 11 are transverse sectional views taken along the lines 9—9, 10—10 and 11—11, respectively, and in the direction of the arrows as indicated in Fig. 7.

Referring primarily to Figs. 1 to 6, the numeral 15 indicates a housing of any desired material and configuration and the end wall 16 of which is provided with an opening through which a stem 17 extends. Secured to the outer end of the latter is a handle 18 which again may embody a pleasing configuration and be readily accessible to the operator. Thus, if the unit is employed in connection with a motor vehicle, the casing 15 may be secured by any desired means (not shown) to the steering column and the handle 18 may thus project from the column at a point conveniently adjacent the steering wheel.

With a view to yieldingly supporting, while permitting movement of the stem 17, a resilient washer or spring 19 may encircle the same and abut against an enlarged portion 20 of the latter. Beyond this enlarged portion the stem is preferably reduced, as indicated at 21, and at this point has associated with it a centralizing mechanism.

According to the present invention, this mechanism includes a series of radially extending springs 22 which have their inner ends bearing against contact plates 23. The intermediate portions of the latter may be curved to conform to the configuration of stem portion 21, and the edges of these plates may be outwardly extended, as indicated at 24, and engage the extended portions of a mounting member or frame 25. A limiting plate 26 is disposed adjacent the frame 25 and prevents excessive movement on the part of the operating stem. This plate is formed with a central opening 27 of a size such that the stem may have ample movement and provides, in conjunction with frame 25, a housing for the springs 22.

The inner end of stem 17 terminates in an enlarged head portion 28 and, as shown, contact members in the form of strips 29 and 30 are disposed adjacent and normally spaced from the same. These strips are preferably curved so as to conform generally to the exterior face of head 28, and it is apparent that this head may engage either of the same, or—by being moved sidewise—may contact both strips 29 and 30 simultaneously.

The casing 15 may have secured to it casing 32 by means of a bolt and nut 31. Casing 32 may be provided with a tongue portion 33 to extend through an opening formed in casing 15 so that the parts are rigidly held against movement. As shown especially in Figs. 1 and 4, casing 32 may also be formed with openings, such that projections 34 may key into the same. These projections form parts of the frame member 25 and thus, the latter is secured in position. Moreover, it is to be noted that a layer 35 preferably extends adjacent to the layer of material provided casing 15 and may be secured in position by means of the assembly 31 and by means of the various other parts which extend adjacent to or through such layer 35.

Finally, it will be noted, that casing 32 is formed with openings through which leads 36 extend. These leads are coupled to terminals 37 and the latter encircle the rivets 31'. Fibre washers 38 serve to insulate the rivets from the parts mounting the same.

Accordingly, if the unit, as shown, is coupled to a ground, and the horns or relays, to which the unit is connected, are not grounded but are rather connected to leads 36, it will be understood that the present unit provides a gap closing switch in the ground connection. Obviously, the parts or the mountings, therefore, might be modified in numerous manners to permit of different functional characteristics occurring, but the arrangement described is preferred. Under these circumstances, it is apparent that by rocking handle 18 to cause an engagement of head 28 and contact strip 29, the lead, connected to the latter, will be grounded, while if the handle is moved in an opposite direction, the lead, connected to strip 30, will be grounded. Swinging of the handle and stem 30 at right angles to the above directions will result in the head contacting both of the strips and simultaneously grounding the leads attached thereto. This grounding will, in each instance, occur through the spring or plate 19, the casing 15 and the parts to which it is coupled. The parts will be returned to their normal and open circuit condition by the assembly provided by springs 22.

In the form of apparatus shown in Figs. 8 to 11, an almost identical construction has been illustrated and, therefore, the same reference numerals have been generally employed. However, in this structure, the stem 39 preferably has no reduced portions but has cooperating with it a plurality of cross-shaped grounding springs or members 40 which serve to maintain a centralized condition of the parts. This will eliminate the necessity for employing the spring assembly 22 and framing member 25.

It is again apparent that in this structure a downward movement of the handle, as viewed in Fig. 7, will cause the upper lead to be grounded, while an opposite movement, will cause the lower lead to be grounded. Sidewise movement in either direction and on the part of the handle will cause both leads to be grounded. In each of these cases, the grounding will serve to close the circuit or circuits, as heretofore described, in connection with Figs. 1 to 6.

From the foregoing, it is obvious that among others, the several objects of the invention, as specifically aforenoted, are achieved. Obviously, numerous changes in construction and rearrangement of the parts might be resorted to without departing from the spirit of the invention as defined by the claims.

Having described my invention, what I now claim is:

1. A switch including a casing, presenting side walls and an end wall, said end wall being formed with an opening, a stem within said casing, a handle secured to said stem, said handle and stem extending through said opening, terminals secured to the side walls of said casing and said stem extending between said terminals and being normally spaced from the same, a framing member encircling said stem and presenting a plurality of recesses and springs disposed within said recesses and having their inner ends acting against said stem to maintain the normal position of the latter.

2. A switch including in combination, a casing, electrically separate contacts mounted upon opposite faces of said casing, an end wall forming a part of said casing and provided with an opening, a stem extending through said opening and adapted to fulcrum against the edges of the same, a handle secured to said stem and positioned exteriorly of said casing, said stem extending between said contacts, said stem being rockable in one direction to engage one of said contacts and in an opposite direction to engage the other of the same, said stem moreover when rocked in a direction substantially at right angles to either of said first named directions simultaneously engaging both of said contacts, a movement limiting plate secured to said casing and formed with an opening through which said stem extends, said plate being disposed at a point short of said contacts and the opening of said plate being of a size adequate to permit of said stem engaging said contacts; the opening being of sufficiently limited size to prevent said stem forcibly engaging said contacts to distort the parts and a series of radially extending springs disposed within said casing at a point adjacent said limiting plate, said springs serving normally to maintain said stem in a position free from engagement with either of said contacts; certain of said springs resisting movements of said stem in either of said first-named directions and others of said springs resisting movements of said stem in the right angular directions.

3. A switch including in combination, a casing, electrically separate contacts mounted upon opposite faces of said casing, an end wall forming a part of said casing and provided with an opening, a stem extending through said opening and adapted to fulcrum against the edges of the same, a handle secured to said stem and positioned exteriorly of said casing, said stem extending between said contacts, said stem being rockable in one direction to engage one of said contacts and in an opposite direction to engage the other of the same, said stem moreover when rocked in a direction substantially at right angles to either of said first named directions simultaneously engaging both of said contacts, a movement limiting plate secured to said casing and formed with an opening through which said stem extends, said plate being disposed at a point short of said contacts and the opening of said plate being of a size adequate to permit of said stem engaging said contacts; the opening being of sufficiently limited size to prevent said stem forcibly engaging said contacts to distort the parts, said casing in cross-section presenting internal angles, a cross-shaped resilient washer disposed within said casing and adjacent the end wall of the same, said stem extending through the opening in said washer and the arms of the latter projecting into the apices of the internal angles of said casing, whereby rotation of said washer with respect to said casing is prevented, said washer serving normally to maintain said stem in a position, such that it will be spaced from said contacts.

CARL E. MEYERHOEFER.